(12) United States Patent
Aher et al.

(10) Patent No.: US 11,989,758 B2
(45) Date of Patent: May 21, 2024

(54) ECOSYSTEM FOR NFT TRADING IN PUBLIC MEDIA DISTRIBUTION PLATFORMS

(71) Applicant: ROVI GUIDES, INC., San Jose, CA (US)

(72) Inventors: Ankur Anil Aher, Maharashtra (IN); Jeffry Copps Robert Jose, Tamil Nadu (IN); Reda Harb, Issaquah, WA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/898,671

(22) Filed: Aug. 30, 2022

(65) Prior Publication Data

US 2024/0070725 A1 Feb. 29, 2024

(51) Int. Cl.
*G06Q 30/00* (2023.01)
*G06Q 30/0241* (2023.01)
*G06Q 30/0273* (2023.01)
*G06V 10/774* (2022.01)

(52) U.S. Cl.
CPC ..... *G06Q 30/0273* (2013.01); *G06Q 30/0276* (2013.01); *G06V 10/774* (2022.01); *G06Q 30/0277* (2013.01); *G06V 2201/10* (2022.01)

(58) Field of Classification Search
None
See application file for complete search history.

(56) References Cited

U.S. PATENT DOCUMENTS

| 7,761,892 | B2 | 7/2010 | Ellis et al. |
| 8,046,801 | B2 | 10/2011 | Ellis et al. |
| 2005/0251827 | A1 | 11/2005 | Ellis et al. |
| 2006/0095339 | A1* | 5/2006 | Hayashi ............ G06Q 30/0641 705/26.8 |
| 2013/0204825 | A1* | 8/2013 | Su ............... G06N 5/02 706/46 |
| 2020/0005284 | A1* | 1/2020 | Vijayan ............ H04L 63/08 |
| 2020/0314330 | A1* | 10/2020 | Takayama ........... H04N 23/65 |
| 2021/0248214 | A1* | 8/2021 | Goldston ............ G06F 16/41 |
| 2021/0287257 | A1* | 9/2021 | Mann ............ G06Q 30/0276 |
| 2022/0075845 | A1* | 3/2022 | Bowen ............ G06F 30/30 |
| 2022/0270084 | A1* | 8/2022 | Xue ............ H04L 9/088 |
| 2022/0318853 | A1* | 10/2022 | Blaikie, III ....... G06Q 30/0255 |
| 2022/0319173 | A1* | 10/2022 | Ricciardi ......... H04N 21/41407 |

(Continued)

FOREIGN PATENT DOCUMENTS

WO WO-2022238854 A1 * 11/2022

OTHER PUBLICATIONS

"Turn Regular Videos Into Cinemagraph NFTs"—https://web.archive.org/web/20211208091324/https://salesp.motionnftmaker.com/cinemagraph/ (Year: 2021).*

*Primary Examiner* — Waseem Ashraf
*Assistant Examiner* — Christopher Stroud
(74) *Attorney, Agent, or Firm* — Haley Guiliano LLP

(57) ABSTRACT

A computer-implemented method and an apparatus are provided for presenting an option to purchase an NFT based on a scene of a media asset to an advertiser. One example computer-implemented method includes obtaining, from a first source, a scene of a media asset, determining that the scene comprises a product, obtaining, from a second source, a non-fungible token (NFT) based on the scene, matching the NFT to an advertiser based on the product, and presenting an option to purchase the matched NFT to the advertiser.

16 Claims, 8 Drawing Sheets

(56) References Cited

U.S. PATENT DOCUMENTS

2022/0366022 A1* 11/2022 Goldston ................ G06F 16/61
2022/0383303 A1* 12/2022 Mullen ................ G06Q 20/389
2023/0045071 A1*  2/2023 Kalaldeh .............. G06Q 20/389

* cited by examiner

400

| Media ID | 1234 | 1235 |
|---|---|---|
| Media Name | Titanic | Frozen |
| Content Owner | Paramount Pictures | Disney |
| NFT ID | 1 | 2 |
| NFT type | video | Image |
| NFT scene start time | 13.48 min | 12.36 min |
| NFT scene end time | 19.23 min | n/a |
| Owned by | Paramount Pictures | NFT Boom Official |
| Current price | 0.0053 ETH | 0.0005 ETH |
| Product | Cars | Food |

402

| User Account | Preferences | Interested Genres |
|---|---|---|
| McDonalds | Food, Hamburgers, French Fries | Soap Operas |
| Coca Cola | Carbonated Drinks | Reality TV shows |
| Starbucks | Coffee, Breakfast | Action Movies & TV Shows |
| John Smith | Drawings of cats, Linkin Park | Romantic Comedies |
| Olivia Garcia | Cars, Airplanes, Vintage microphones | Action Movies & TV Shows |

ECOSYSTEM FOR NFT TRADING IN PUBLIC MEDIA DISTRIBUTION PLATFORMS

BACKGROUND

The present disclosure relates to computer-implemented methods and an apparatus for obtaining, from a first source, a scene of a media asset, determining that the scene comprises a product, and obtaining, from a second source, a non-fungible token (NFT) based on the scene. More particularly, the present disclosure relates to computer-implemented methods and an apparatus for matching an NFT to an advertiser based on a product, and presenting an option to purchase the matched NFT to the advertiser.

SUMMARY

A non-fungible token (NFT) is a unique and non-interchangeable unit of data stored on a digital ledger. NFTs can be associated with easily reproducible items such as photos, videos, audio, and other types of digital files as unique items, and use blockchain technology to give the NFT a public proof of ownership. Content creators can generate and sell their created media (or parts of media) on an NFT marketplace. For example, a movie production house may like to sell media asset scenes (such as movie scenes/stills) as NFTs. Also, users may want to purchase NFT of their favorite media asset scenes of their favorite movies. The current ecosystem to achieve this has many shortcomings. In this draft, we present an ecosystem to trade NFT in media distribution platforms like TiVo. The advancement of blockchain technology has created massive opportunities for content creators to trade their digital content as NFT. At present, there exist NFT marketplaces. Such platforms enable users to discover, purchase and sell NFTs. A movie production house may sell movie scenes/stills as an NFT on such platforms. However, in this current ecosystem it is difficult for interested users to discover and purchase the movie scene/still NFTs of their interest. For example, an interested user would have to pause watching a movie and start a search for a particular scene on a separate device or system and subsequently explore if an NFT exists for that scene or not. Accordingly, there is a need in the industry to provide methods and arrangement which allow users to seamlessly search for NFTs for a particular scene (or set of scenes) without interrupting playback of the media asset.

A computer-implemented method and an apparatus are described below for presenting an option to purchase an NFT based on a scene of a media asset to an advertiser.

In some embodiments, a computer-implemented method is provided in which a scene (for example, a still image, a video, or a text) of a media asset is obtained from a first source (for example, media content source). Following on from this, a determination is carried out (for example, by a machine learning (ML) algorithm) that the scene comprises a product. The product may comprise a brand name or logo, or an item (for example, food, clothing, luxury, etc.). The brand product may comprise a line drawing, a color drawing, a written description, or any combination thereof. A non-fungible token (NFT) (and/or a cinemagraph) is then obtained from a second source (for example, an NFT content source and an NFT content source database). The NFT is subsequently matched to an advertiser based on the product (for example, by retrieving information from a user preference database and correlating preferences with a user account). An option to purchase the matched NFT is then presented to the advertiser (for example, by displaying a pop-up notification on the user interface of user device prompting the user to "Purchase NFT?").

In some embodiments obtaining, from the second source, the NFT based on the scene can further comprise sending a request for an NFT to the second source, the second source comprising a database of a plurality of NFTs, sending first metadata based on the scene of the media asset to the second source, comparing the first metadata with metadata of each of the plurality of NFTs in the database, and if metadata of an NFT in the database matches the first metadata, receiving the NFT with matching metadata from the second source. Optionally, this may further comprise requesting the second server to generate an NFT based on the scene if no NFT is identified in the database with metadata matching the first metadata of the scene, and obtaining, from the second source, the generated NFT based on the scene.

In some embodiments metadata may comprise any one of an NFT type, a scene start time, a scene end time, ownership of the scene, and/or a bidding price for the NFT. In further embodiments, the NFT may comprise a cinemagraph. In yet further embodiments, the product may comprise any one of a brand name, or a product name. In further embodiments still, the scene may comprise any one of an image, a video, a text, or any combination of the thereof.

In some embodiments, determining that the scene comprises a product further comprises automatically extracting image metadata from the scene, feeding the image metadata to a machine learning (ML) algorithm, and receiving an output from the ML algorithm.

In some embodiments, matching the NFT to the advertiser further comprises, receiving, using control circuitry, metadata based on an advertiser's preference, determining, using machine learning, an NFT suitability score based on the advertiser's preferences, and matching, using control circuitry, the NFT to the advertiser if the NFT suitability score is above a threshold.

In some embodiments, presenting an option to purchase the generated NFT to the advertiser further comprises, generating, using control circuitry, an indication/notification to purchase the generated NFT, determining, using control circuitry, that additional NFTs related to the generated NFT are available for purchase at the second source, receiving, using control circuitry, a request to purchase the generated NFT, the additional NFTs, or a combination of the two, generating, using control circuitry, a payment request to a third source, receiving, using control circuitry, an acknowledge notification from the third source if payment has been accepted, and receiving, using control circuitry, the purchased generated NFT, additional NFTs, or combination of the two from the second source.

In some embodiments, an apparatus is presented which may comprise a memory storing instructions, communication paths, and control circuitry coupled to the communication paths and the memory and configured to execute the instructions to obtain, from a first source via the communication paths, a scene of a media asset, determine that the scene comprises a product, obtain, from a second source via the communication paths, a non-fungible token (NFT) based on the scene, match the NFT to an advertiser based on the product; and present an option to purchase the matched NFT to the advertiser.

It should be noted that the methods, apparatuses, and/or aspects described above may be applied to, or used in accordance with, other systems, methods, apparatuses, and/or aspects described in this disclosure.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which:

FIG. 4 shows an illustrative example of a database of an NFT content source and a user preference database, in accordance with some embodiments of the disclosure;

DETAILED DESCRIPTION

Systems and methods are described herein for presenting an option to purchase an NFT based on a scene of a media asset. Media assets include audio, video and/or any other media content. Audio includes audio-only content, such as podcasts, stories and music. Video includes audiovisual content such as movies and/or television programs. A media item may comprise a number of scenes, portions, or chapters. These scenes may be identified in metadata associated with the media item and may include titles and/or descriptions related to the content of the portion. The media item may be of any suitable known format. One example of a suitable media item is one that complies with the MPEG DASH standard.

The disclosed methods and systems may be implemented on one or more computing devices. As referred to herein, the computing device can be any device comprising a processor and memory, for example, a television, a smart television, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, a smartwatch, an augmented reality device, a mixed reality device, a virtual reality device, or any other television equipment, computing equipment, or wireless device, and/or combination of the same.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, random access memory (RAM), a solid-state drive (SSD) etc.

Figure 1:
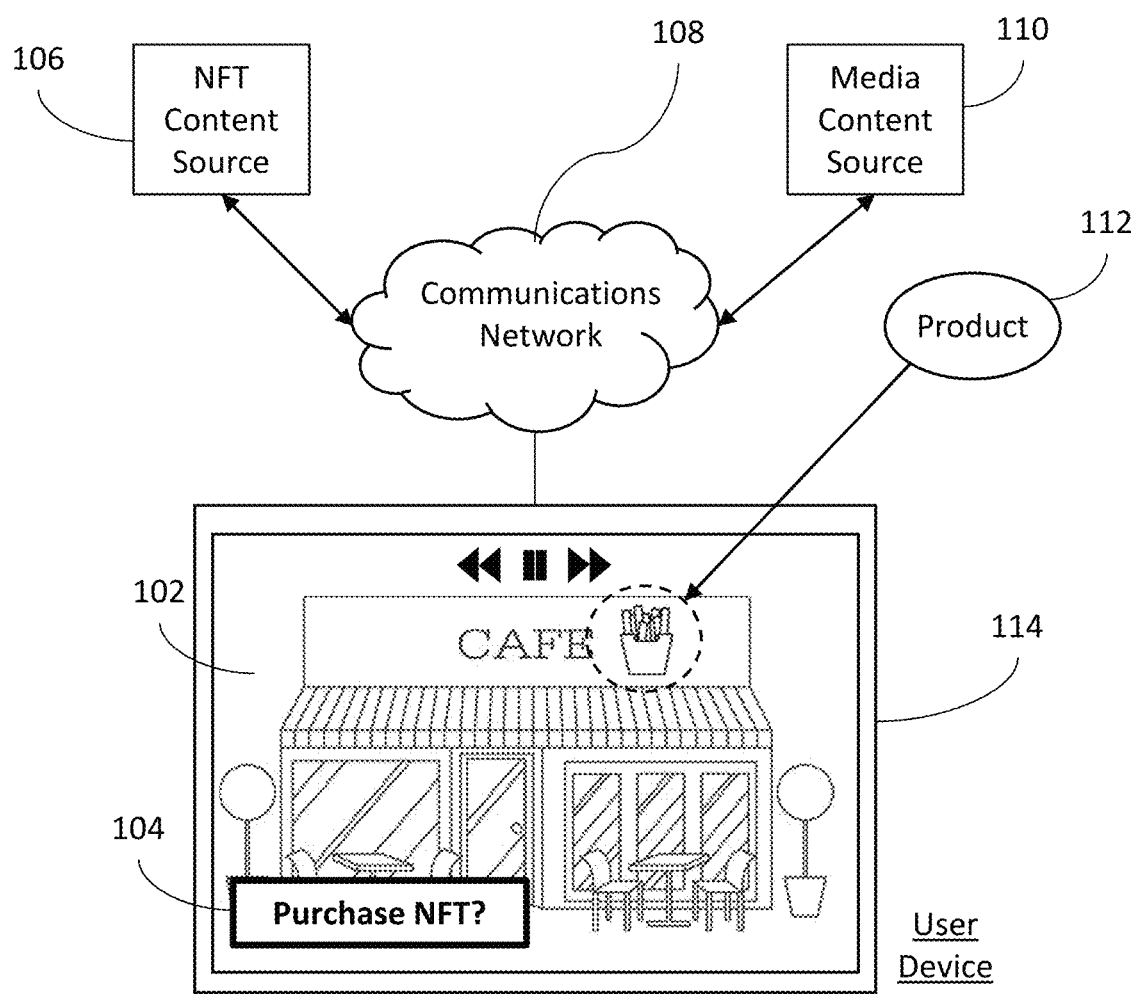
FIG. 1 shows an example scenario of a media system obtaining an NFT based on a scene and presenting an option to purchase the NFT, in accordance with some embodiments of the disclosure.

FIG. 1 shows an example scenario of a media system 100 obtaining an NFT based on a scene 102 (for example, presented to a user on a user device 114) and presenting an option to purchase the NFT 104, in accordance with some embodiments of the disclosure. FIG. 1 also shows an NFT content source 106, a media content source 110, and the user device 114 all in communication with each other by means of a communications network 108, as is described in more detail below with reference to FIGS. 2 and 3.

In an exemplary embodiment, a request for a media asset can be sent (for example, from user device 114) to a media content source 110. In response to this, the media content source 110 can provide the requested media asset to the user device 114 which can playback the media asset to the user (for example, by displaying the video on a display and playing the audio through speakers as described in more detail with reference to FIG. 3 below). The media system 100 may then determine that a scene 102 of the media asset comprises a product 112 (for example, french fries as depicted in FIG. 1) with use of a machine learning (ML) algorithm. The product 112 may comprise a brand name or logo, or an item (for example, food, clothing, luxury, etc.). The brand product may comprise a line drawing, a color drawing, a written description, or any combination thereof. If a product 112 is detected in the scene 102, a request may be sent to the NFT content source 106 to verify if an NFT for that scene 102 exists. In some examples, the media system 100 can maintain details of available NFTs associated with a media asset as metadata (for example, by storing the metadata on the NFT content source 106) and verifying if an NFT for that scene 102 exists may comprise comparing metadata of the scene 102 with metadata stored on the NFT content source 106. If an NFT exists for that scene 102, a user preference database can be accessed to match the product 112 in the scene 102 to the user (the user may be an advertiser or a user with specific user preferences).

For example, a user or advertiser such as a hamburger joint might have a specific preference for french fries. Accordingly, the hamburger joint might be interested in purchasing an NFT for a scene 102 with a product 112 depicting french fries as shown in FIG. 1. If the product 112 is matched to the user, an option to purchase the NFT 104 (for example, a pop-up button on a user interface) can be presented to the user.

In a different example, the user may be watching a movie and may select an interesting scene 102 to be purchased as an NFT. A request can be sent to the NFT content source 106 to evaluate if an NFT is available for the requested scene 102. If the scene 102 is available as an NFT for trading, the media system 100 can provide NFT details to the user and an option to purchase 104. If the scene 102 is unavailable as an NFT, the media system 100 can provide a request to generate and purchase the NFT. A content creator in communication with the NFT content source may accept the request and may, in response to the request, mint a new NFT for the associated scene on the NFT marketplace (for example, the NFT content source) and provide a purchase option to the user. Alternatively, the NFT content source 106 can, in response to receiving the request to generate and purchase the NFT, automatically generate an NFT for the scene 102 and offer to sell the NFT to the user. In some embodiments, the NFT content source 106 (or the content creator) may only generate the NFT after the user makes a purchase.

In some embodiments, the user and/or advertiser can be presented with the option of purchasing a cinemagraph which may or may not be an NFT. Cinemagraph advertising is gaining popularity on social media platforms. Companies, such as automobile manufactures, and Dunkin Donuts are already using them. Cinemegraph advertisements are still photographs where only a portion of the photograph includes some sort of motion. An example of a cinemagraph can be a picture of barbeque and a picnic table next to each other, with Pepsi bottles on the picnic table. In the cinemagraph, the motion in the picture may be the smoke coming out of the BBQ, or the bubbles in the Pepsi bottles, or a combination of the two. The cinemagraph can be obtained from a separate cinemagraph content source (similar to the NFT content source 106). If a cinemagraph does not exist for the scene 102, a cinemagraph can be generated (for example, by capturing the scene 102 and feeding it into a cinemagraph generating program such as Flixel's Cinemagraph Pro software).

Advertisers can greatly benefit from using media scenes 102 within popular media items in creating advertisements for their products and services. In particular, if advertisers were to own the portion of the content as an NFT, then the content owner can still control its copyright, but the advertisers can use it in advertising, or put it on their social homepage, which creates an association between the content item and the advertiser or brand.

Figure 2:
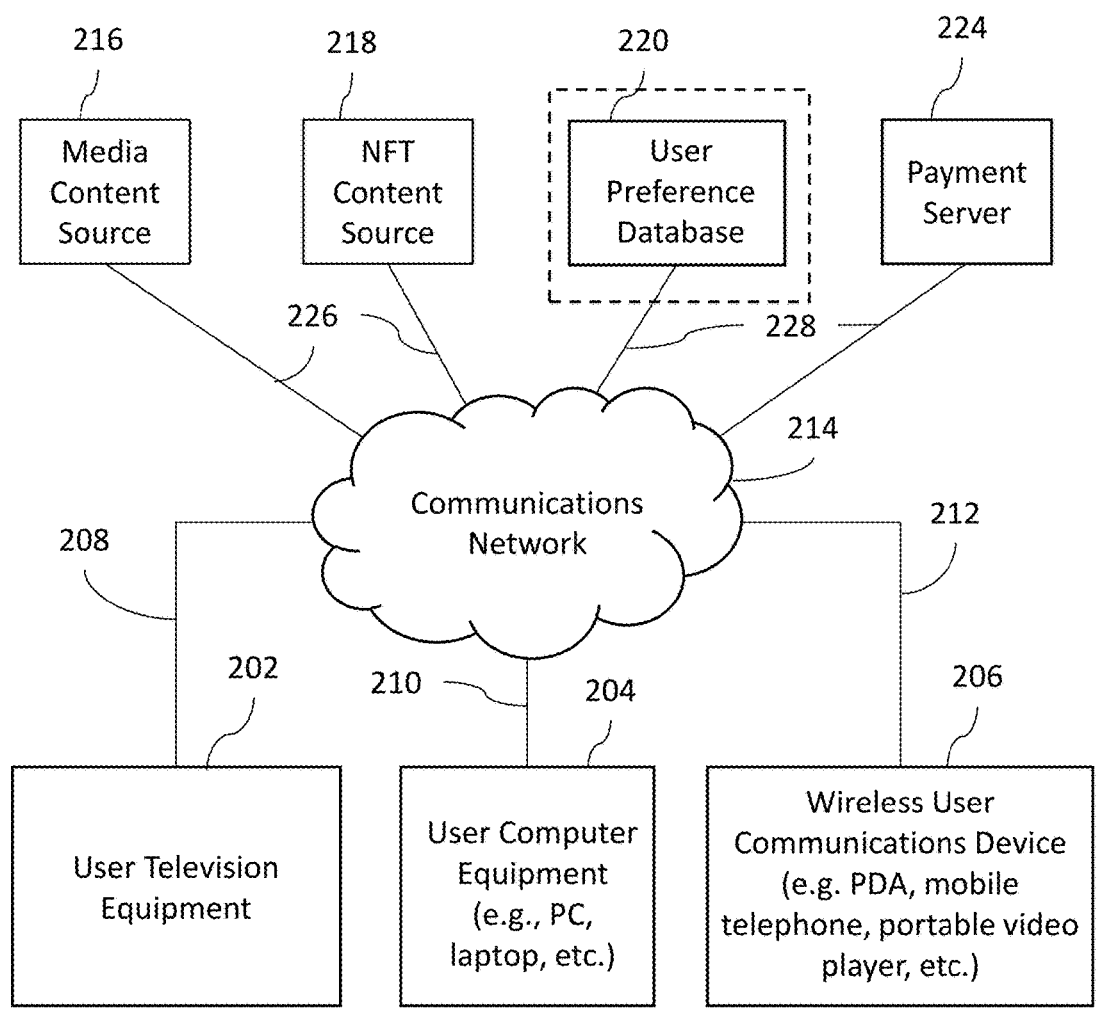
FIG. 2 shows a block diagram of an illustrative media system, in accordance with some embodiments of the disclosure.

FIG. 2 shows an illustrative media system (such as the media system 100 as described in FIG. 1 above) implementing a user device (such as the user device 114 as depicted in FIG. 1 above) as a user television equipment 202, user computer equipment 204, wireless user communications device 206, or any other type of user equipment suitable for accessing content, such as a non-portable gaming machine. The user television equipment 202, user computer equipment 204, wireless user communications device 206, or any other type of user equipment suitable for accessing content may be substantially similar to user device 114 as described above with reference to FIG. 1. For simplicity, these devices may be referred to herein collectively as user equipment or user equipment devices, and may be substantially similar to user equipment devices described below. User equipment devices, on which a media guidance application may be implemented, may function as stand-alone devices or may be part of a network of devices. Various network configurations of devices may be implemented and are discussed in more detail below.

Figure 3:
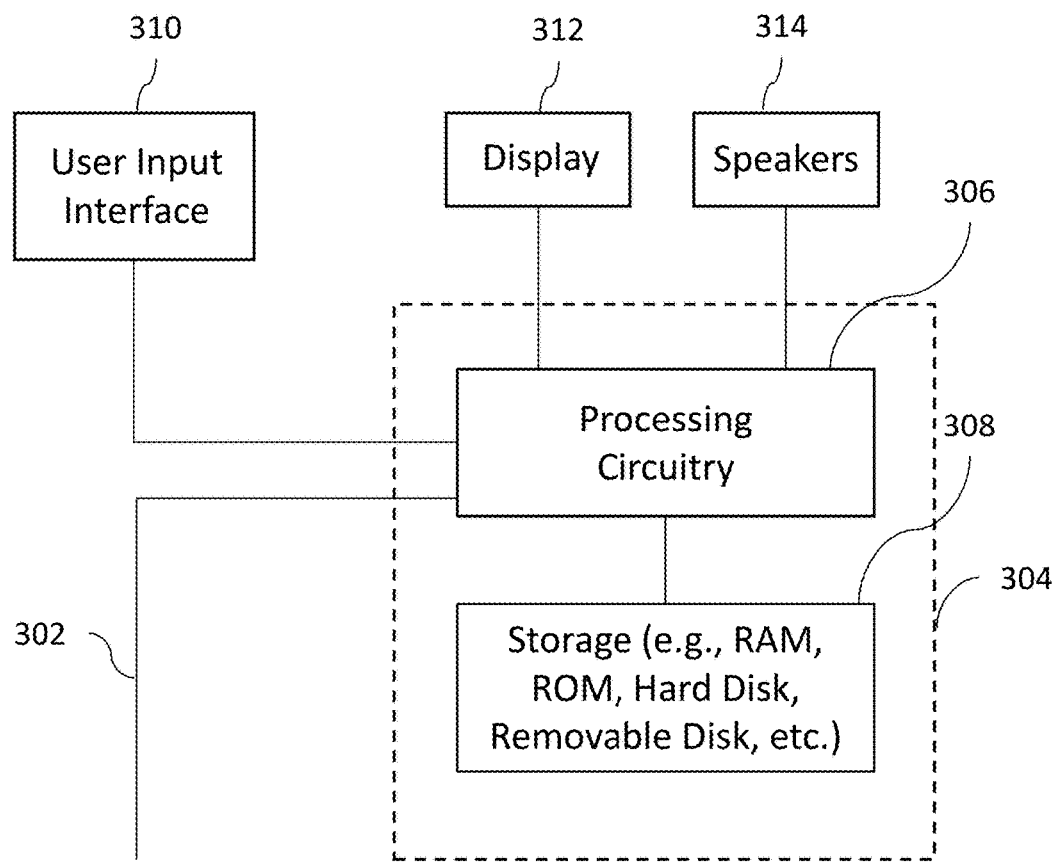
FIG. 3 shows a block diagram of a media device and of control circuitry comprising a processor and memory, in accordance with some embodiments of the disclosure.

A user equipment device utilizing at least some of the system features described below in connection with FIG. 3 may not be classified solely as user television equipment 202, user computer equipment 204, or a wireless user communications device 206. For example, user television equipment 202 may, like some user computer equipment 204, be Internet-enabled, allowing for access to Internet content, while user computer equipment 204 may, like some television equipment 202, include a tuner allowing for access to television programming. The media guidance application may have the same layout on various different types of user equipment or may be tailored to the display capabilities of the user equipment. For example, on user computer equipment 204, the guidance application may be provided as a web site accessed by a web browser. In another example, the guidance application may be scaled down for wireless user communications devices 206.

In system 200, there is typically more than one of each type of user equipment device but only one of each is shown in FIG. 2 to avoid overcomplicating the drawing. In addition, each user may utilize more than one type of user equipment device and also more than one of each type of user equipment device.

In some embodiments, a user equipment device (for example, user television equipment 202, user computer equipment 204, wireless user communications device 206) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (for example, user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 214. Namely, user television equipment 202, user computer equipment 204, and wireless user communications device 206 are coupled to communications network 214 via communication paths 208, 210, and 212, respectively. Communications network 214 may be one or more networks including the Internet, a mobile phone network, mobile voice or data network (for example, a 4G or LTE network), cable network, public switched telephone network, or other types of communications network or combinations of communications networks. Paths 208, 210, and 212 may separately or together include one or more communication paths, such as, a satellite path, a fiber-optic path, a cable path, a path that supports Internet communications (for example, IPTV), free-space connections (for example, for broadcast or other wireless signals), or any other suitable wired or wireless communication path or combination of such paths. Paths 208, 210, and 212 may each be a wireless path or wired path. Communications with the user equipment devices may be provided by one or more of these communication paths, but are shown as a single path for each device in FIG. 2 to avoid overcomplicating the drawing.

Although communication paths are not drawn between user equipment devices, these devices may communicate directly with each other via communication paths, such as those described above in connection with paths 208, 210, and 212, as well as other short-range point-to-point communication paths, such as USB cables, IEEE 1394 cables, wireless paths (for example, Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 214.

System 200 includes media content source 216, NFT content source 218, user preference database 220, and payment server 224 coupled to communications network 214 via communication paths 226 and 228, respectively. Paths 226 and 228 may include any of the communication paths described above in connection with paths 208, 210, and 212. Communications with the content source 216, NFT content source 218, user preference database 220, and payment server 224 may be exchanged over one or more communication paths, but are shown as a single path in FIG. 2 to avoid overcomplicating the drawing. In addition, there may be more than one of each of content source 216, NFT content source 218, user preference database 220, and payment server 224, but only one of each is shown in FIG. 2 to avoid overcomplicating the drawing. (The different types of each of these sources are discussed below.) If desired, content source 216, NFT content source 218, user preference database 220, and payment server 224 may be integrated as one source device. Although communications between sources 216, 218, 220, and 224 with user equipment 202, 204, and 206 are shown as through communications network 214, in some embodiments, sources 216, 218, 220 and 224 may communicate directly with user equipment 202, 204, and 206 via communication paths (not shown) such as those described above in connection with paths 208, 210, and 212.

Media content source 216 may include one or more types of content distribution equipment including a television distribution facility, cable system headend, satellite distribution facility, programming sources (for example, television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 216 may be the originator of content (for example, a television broadcaster, a Webcast provider, etc.) or may not be the originator of content (for example, an on-demand content provider, an Internet provider of content of broadcast schedules for downloading, etc.). Content source 216 may include cable sources, satellite providers, on-demand providers, Internet providers, over-the-top content providers, or other providers of content. Content source 216 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

NFT content source 218 may indicate a set of metadata that may be stored within an NFT content source database (as described below with reference to FIG. 4) for each NFT. The set of metadata stored within the NFT content source 218 can indicate the type of metadata that is stored within the NFT content source database 402. For example, the set of metadata may comprise a media asset name (for example, Titanic, Frozen), a content owner of the movie (for example, Paramount Pictures, Disney), a specific NFT ID number (for example a serial number comprising alphanumeric characters and/or special characters), or an NFT type (for example, video, image, text, or other media asset). Other examples of NFT metadata fields can include, relative to the media asset, an NFT scene start time and an NFT scene end time in the case of the NFT type being a scene within a video or audio media asset. Alternatively, the NFT metadata field can only include the NFT scene start time, relative to the media asset, in the case of the NFT type being an image from a media asset. Further NFT metadata fields can include an Owned By field to indicate the ownership of the NFT (as opposed to the ownership of the media asset). This may be the same or different to the Content Owner. The NFT metadata fields can also include a current price to purchase the NFT and may further include any products within the NFT (for example, cars, food, brand names, etc.).

User Preference Database 220 is optionally coupled to communications network 214 and may comprise a database of user accounts, their preferences and which genres of media asset they are interested in. User accounts may include accounts of single or multiple private users and/or advertisers interested in purchasing NFTs relating to a scene (or multiple scenes) of a media asset. For example, user account "McDonalds" might have preferences of purchasing an NFT related to "Food", "Hamburgers", and/or "French Fries". McDonald's might also be interested in purchasing NFTs from Soap Operas. In a different example, simple user Oliva Garcia might have preferences for "cars", "Airplanes" and/or "Vintage Microphones" and might enjoy genres such as "Action Movies" and "Action TV shows". Each user account may update their preferences and interested genres on the user preference database at any point.

Payment Server may 224 provide a third party option of user payment and may be coupled to a user's online payment service. This may include, but not be limited, a user's bank account, credit card account, cryptocurrency wallet, or other method of payment.

In addition to this, system 200 may include a media guidance data source (not shown). Media guidance data source be coupled to communications network 214 via communications paths 226 and/or 228. Communications with the media content source 216, NFT content source 218, user preference database 220, and payment server 224 and the media guidance data source may be exchanged over one or more communication paths. Media guidance data source may provide media guidance data, such as the media guidance data described above and below. Media guidance data may be provided to the user equipment devices using any suitable approach. In some embodiments, the guidance application may be a stand-alone interactive television program guide that receives program guide data via a data feed (for example, a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source may be provided to users' equipment using a client/server approach. For example, a user equipment device may pull media guidance data from a server, or a server may push media guidance data to a user equipment device. In some embodiments, a guidance application client residing on the user's equipment may initiate sessions with source to obtain guidance data when needed, for example, when the guidance data is out of date or when the user equipment device receives a request from the user to receive data. Media guidance may be provided to the user equipment with any suitable frequency (for example, continuously, daily, a user-specified period of time, a system-specified period of time, in response to a request from user equipment, etc.). Media guidance data source may provide user equipment 202, 204, and 206 the media guidance application itself or software updates for the media guidance application.

In some embodiments, the media guidance data may include viewer data. For example, the viewer data may include current and/or historical user activity information (for example, what content the user typically watches, what times of day the user watches content, whether the user interacts with a social network, at what times the user interacts with a social network to post information, what types of content the user typically watches (for example, pay TV or free TV), mood, brain activity information, etc.). The media guidance data may also include subscription data. For example, the subscription data may identify to which sources or services a given user subscribes and/or to which sources or services the given user has previously subscribed but later terminated access (for example, whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (for example, a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (for example, media guidance data source) running on control circuitry of the remote server. When executed by control circuitry of the remote server (such as media guidance data source), the media guidance application may instruct the control circuitry to generate the guidance application displays and transmit the generated displays to the user equipment devices. The server application may instruct the control circuitry of the media guidance data source to transmit data for storage on the user equipment. The client application may instruct control circuitry of the receiving user equipment to generate the guidance application displays.

Content and/or media guidance data delivered to user equipment 202, 204, and 206 may be over-the-top (OTT) content. OTT content delivery allows Internet-enabled user devices, including any user equipment device described below, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (for example, web-based applications or cloud-based applications), or the content can be displayed by media guidance applications stored on the user equipment device.

Media guidance system 200 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 2.

In one approach, user equipment devices may communicate with each other within a home network. User equipment devices can communicate with each other directly via short-range point-to-point communication schemes described above, via indirect paths through a hub or other similar device provided on a home network, or via communications network 214. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005, which is hereby incorporated by reference herein in its entirety. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (for example, recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 216 to access content. Specifically, within a home, users of user television equipment 202 and user computer equipment 204 may access the media guidance application to navigate among and locate desirable content. Users may also access the media guidance application outside of the home using wireless user communications devices 206 to navigate among and locate desirable content.

In a fourth approach, user equipment devices may operate in a cloud computing environment to access cloud services. In a cloud computing environment, various types of computing services for content sharing, storage or distribution (for example, video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 214. These cloud resources may include one or more content sources 216, one or more NFT content sources 218, one or more user preference databases 220, one or more payment servers 224, and one or more media guidance data sources. In addition or in the alternative, the remote computing sites may include other user equipment devices, such as user television equipment 202, user computer equipment 204, and wireless user communications device 206. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 204 or wireless user communications device 206 having a content capture feature. Alternatively, the user can first transfer the content to a user equipment device, such as user computer equipment 204. The user equipment device storing the content uploads the content to the cloud using a data transmission service on communications network 214. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Users may access media content and the media system 100 (and its display screens described above and below) from one or more of their user equipment devices. FIG. 3 shows a generalized embodiment of illustrative user equipment device 300. More specific implementations of user equipment devices are discussed above in connection with FIG. 2. User equipment device 300 may receive content and data via input/output ("I/O") path 302. I/O path 302 may provide content (for example, broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communication paths (as described above with reference to FIG. 2). I/O functions may be provided by one or more of these communication paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (for example, dual-core, quad-core, hexa-core, or any suitable number of cores) or supercomputer. In some embodiments, processing circuitry may be distributed across multiple separate processors or processing units, for example, multiple of the same type of processing units (for example, two Intel Core i7 processors) or multiple different processors (for example, an Intel Core i5 processor and an Intel Core i7 processor).

In client/server-based embodiments, control circuitry 304 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, an Ethernet card, or a wireless modem for communications with other equipment, or any other suitable communications circuitry. Such communications may involve the Internet or any other suitable communications networks or paths (which are described above in more detail in connection with FIG. 2). In addition, communications circuitry may include circuitry that enables peer-to-peer communication of user equipment devices, or communication of user equipment devices in locations remote from each other (described in more detail above).

Memory may be an electronic storage device provided as storage 308 that is part of control circuitry 304. In some embodiments, storage 308 may me coupled to processing circuitry 306 (for example, by I/O communication paths). As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (for example, to launch a boot-up routine and other instructions). Cloud-based storage, described in relation to FIG. 2, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (for example, for converting over-the-air, analog, or digital signals to MPEG signals for storage) may also be provided. Control circuitry 304 may also include scaler circuitry for upconverting and downconverting content into the preferred output format of the user equipment 300. Control circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (for example, watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (for example, in storage 308), and data for use by the application is downloaded on a periodic basis (for example, from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote from the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (for example, control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (for example, a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (for example, those employing MPEG-2 or other digital media encoding schemes), the guidance application may be, for example, encoded and transmitted in an MPEG-2 object carousel with the MPEG audio and media item of a schedule.

FIG. 4 shows an example NFT content source database 402 indicating a set of metadata that may be stored within the NFT content source database 402 for each NFT. NFT content source database 402 may be substantially the same as NFT content source 218 as described above with reference to FIG. 2. The set of metadata stored within the NFT content source database 402 can be separated into fields (depicted on the left column of the NFT content source database 402) to indicate the type of metadata that is stored within the NFT content source database 402. For example, the set of metadata may comprise a media asset name (for example, Titanic, Frozen), a content owner of the movie (for example, Paramount Pictures, Disney), a specific NFT ID number (for example a serial number comprising alphanumeric characters and/or special characters), or an NFT type (for example, video, image, text, or other media asset). Other examples of NFT metadata fields can include, relative to the media asset, an NFT scene start time and an NFT scene end time in the case of the NFT type being a scene within a video or audio media asset. Alternatively, the NFT metadata field can only include the NFT scene start time, relative to the media asset, in the case of the NFT type being an image from a media asset. Further NFT metadata fields can include an Owned By field to indicate the ownership of the NFT (as opposed to the ownership of the media asset). This may be the same or different to the Content Owner. The NFT metadata fields can also include a current price to purchase the NFT and may further include any products within the NFT (for example, cars, food, brand names, etc.).

A sample metadata would be as follows:
Media ID: 1234
Media Name: Titanic
Content Owner: Paramount Pictures
NFTs:
NFT ID: 1
   NFT type: video
   NFT scene start time: 13.48 min
   NFT scene end time: 19.23 min
   Owned by: Paramount Pictures
   Current price: 0.0053 ETH
Media ID: 1235
Media Name: Frozen
Content Owner: Disney
NFTs:
NFT ID: 2
   NFT type: image
   NFT scene start time/still image time: 12.36 min
   Owned by: NFT Boom Official
   Current price: 0.0005 ETH Some of the NFT metadata fields are static like NFT type, NFT scene start time, NFT scene end time. Their values do not change with time. However, some of the fields are dynamic like—Owned by, Current price, etc. Their values may change as trades and transaction happen in the NFT marketplace. Accordingly, a current price may also reflect a bidding price for the NFT. NFT current price is Ethereum, but can be any currency used to purchase an NFT from the NFT marketplace. NFT metadata may be used to identify a specific NFT (or set of NFTs) within the NFT content source database 402. For example, this may occur when a user makes a scene selection to purchase an NFT. This can be achieved by receiving a set of metadata from a scene (such as, but not limited to, a media asset scene) and comparing the metadata of the scene to the set of metadata stored within the NFT content source database 402. Once the specific NFT (or set of NFTs) have been identified, they may be sent to a user device, as described in FIGS. 1 and 2 above, and FIGS. 5 to 8 below.

FIG. 4 also shows an example user preference database 404 which may be substantially similar to the user preference database 220 as described above with reference to FIG. 2. User preference database 404 may comprise a database of user accounts, their preferences and which genres of media asset they are interested in. User accounts may include accounts of single or multiple private users and/or advertisers interested in purchasing NFTs relating to a scene (or multiple scenes) of a media asset. For example, user account "McDonalds" might have preferences of purchasing an NFT related to "Food", "Hamburgers", and/or "French Fries".

McDonald's might also be interested in purchasing NFTs from Soap Operas. In a different example, simple user Oliva Garcia might have preferences for "cars", "Airplanes" and/or "Vintage Microphones" and might enjoy genres such as "Action Movies" and "Action TV shows". Each user account may update their preferences and interested genres on the user preference database 404 at any point.

In some examples, a scene of a media asset can be parsed through a machine learning (ML) algorithm to determine if a product (for example, french fries as depicted in FIG. 1 above, and/or hamburgers, carbonated drinks, or similar) or a user account (for example a user's name/brand name such as McDonalds, Coca cola, Starbucks, John Smith, and/or Oliva Garcia as depicted in FIG. 4) are present within the media asset. Accordingly, in some examples, the product can comprise any one of a brand name, or a brand product. If a product is determined to be within a scene of the media asset, metadata related to that scene can be sent to the NFT content source database 402 to identify any possible existing NFTs for that scene. Furthermore, the product in the media asset can be matched by user preference database 404 to a user account (for example, if the product is "French Fries", it can be matched to "McDonalds"). Subsequently, McDonald's can be presented with an option to purchase the identified NFT. In one example, McDonald's can actively watch/listen to/read the media asset and the media system 100 can present a pop-up notification (for example un user device 114) to "Purchase NFT" to McDonalds. In another example, the media asset can be played back on any user device and, the detection of a product in a scene of the media asset related to a user account can automatically trigger a notification to be sent to the relevant user account (for example, McDonalds) with an option to purchase the matched NFT.

In some examples, at least one of the user accounts (for example, McDonalds) might have a subscription service which automatically scans media assets played back on a plurality of user devices in search for scenes with specified products in them. In return, the user accounts may each be provided with a notification providing an option to purchase an NFT related to that scene at the time at which the scene is played. Previous notifications can be saved, for example on a server, and can be retrieved by the user account at a later date. Accordingly, the user account can be provided the option to purchase NFTs for each scene of a plurality of media assets in which the user account's specified products came up.

If an NFT is available for the selected scene, the media system 100 can provide the NFT details to the user and an option to purchase the NFT as described above and below. For example, in a first case, the user selection of the scene 102 may exactly match start and end times of an available NFT. In such a case the media system 100 can evaluate if the NFT is available for trade and present appropriate details to the user for its purchase (for example, by providing an option to purchase pop-up 104 as described above). In a second case, the user selection of the scene 102 may only partially match the available NFT timeframe. For example, the user requested an NFT for a scene from 13.50 min to 19.25 min and the available NFT is from 13.48 min to 19.23 min. If the timeframe overlap is over a threshold value, the system can still provide an option to purchase the NFT to the user for the available NFT with adjusted timeframe. In that scenario, the user may be provided with a further indication that the available NFT matches the requested NFT by a certain percentage (which may be calculated by attributing how many metadata fields match the user's request compared to the total number of metadata fields). In a third case, the user selection can be a superset of multiple NFTs in the selected timeframe. For example, the user requested NFT for 13.50 min to 19.25 min and the available NFTs are from 13.48 min to 15.23 min and 16.48 min to 19.23 min. The system can provide an option to purchase each of the NFTs available for purchase in the selected timeframe.

In case the user wants to purchase the NFT, the media system 100 can redirect the user to the NFT marketplace (for example, the NFT content source 218, 402) on user's primary or secondary media device 114. Alternatively, or additionally the media system 100 may access a payment server (for example, payment server 224) which may be in communication with the NFT marketplace to allow the user a direct purchase option on a user interface of the media device 114 itself. In that embodiment, the user may have integrated a means to pay (such as, but not limited to, a digital currency wallet) to store the NFT related credentials and all sufficient currency to make the transaction. Automatic debiting rights in the system may be applied behind a single sign on (such as a "one-click" interface when the user switches on the user device 114) which allows the transaction to happen automatically without the user having to perform any additional steps.

In some embodiments, the user may select the start time/position and end time/position of the scene on a progress bar of the user device using, for example, a remote controller or by touching/dragging the progress bar on the device screen. The user may additionally or alternatively use voice and/or text commands to specify the start time/position and end time/position of the scene on the progress bar. The user may also use voice/text query to specify the scene in a more generic way, for example, by stating "select this scene" or "select the last comedy scene". With the use of natural language processing (NLP) systems, the user device 114 may then select start time/position and end time/position of the scene. Furthermore, a user may use voice and/or text queries to specify an event in the program such as "select the goal scored by Ronaldo".

In some embodiments, instead of the user clicking on a button to purchase the NFT, the user can use a voice remote or voice interface to utter a specific phrase like "Get this scene into my wallet". A phrase or sentence that is distinctive enough from "Buy this" which may indicate the content to be stored for later viewing. Upon applying a natural language processing (NLP) system that determine an intent between storing content for later consumption vs buying into a NFT wallet.

Figure 5:
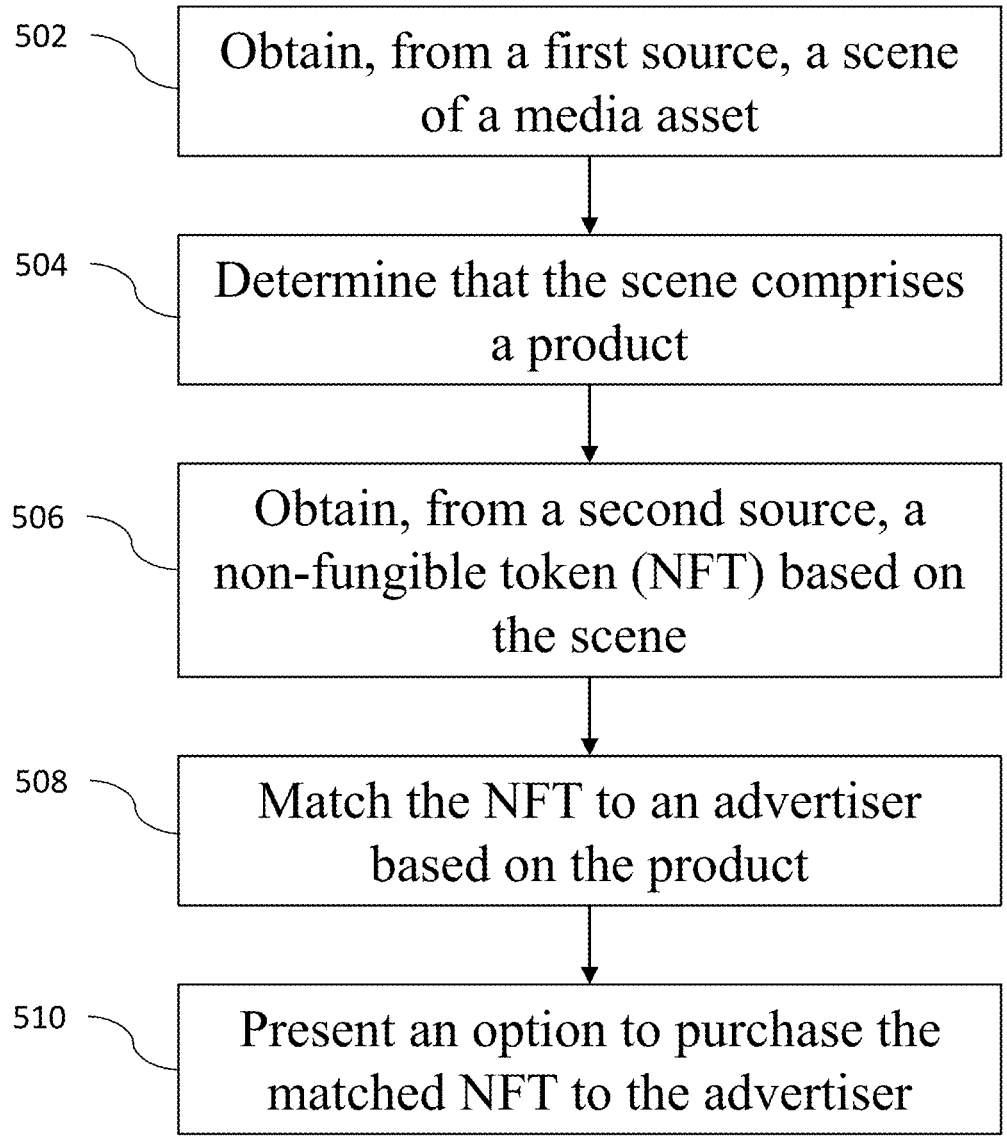
FIG. 5 shows a flowchart of illustrative steps involved in presenting an option to purchase an NFT, in accordance with some embodiments of the disclosure.
Figure 6:
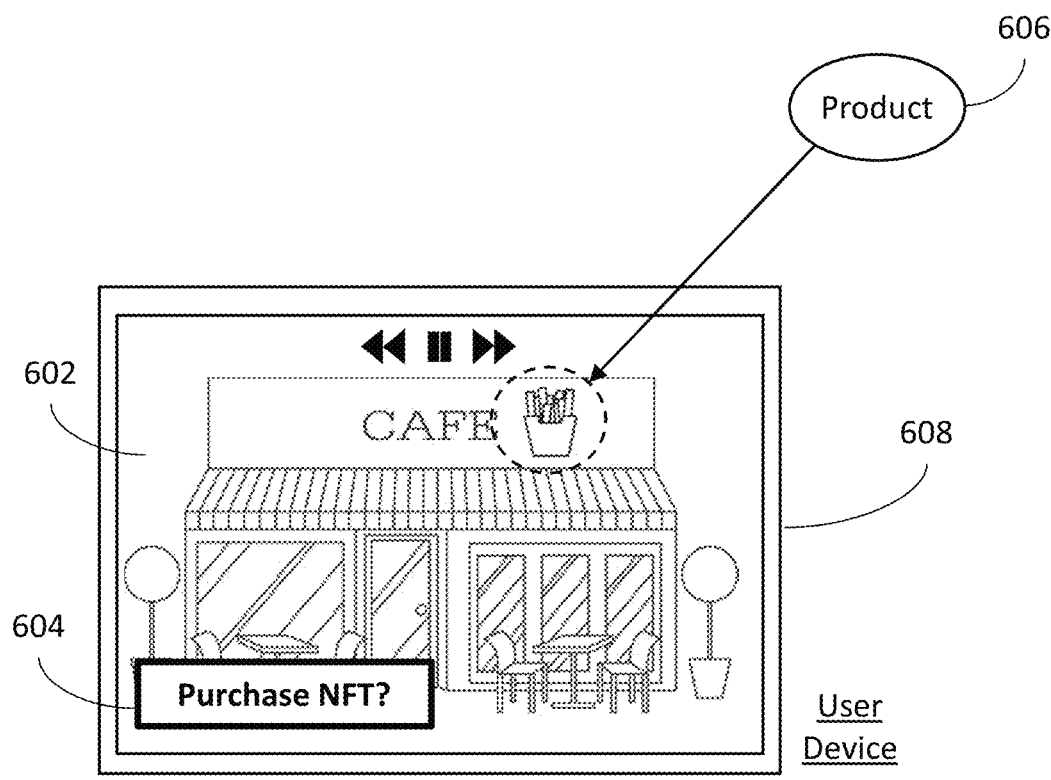
FIG. 6 shows a block diagram of an illustrative media system, in accordance with some embodiments of the disclosure.

FIG. 5 is a flowchart of illustrative steps involved in presenting an option to purchase an NFT, in accordance with the arrangement described above with reference to FIGS. 1 to 4. FIG. 6 shows a block diagram of user interface carrying out the illustrative steps as described in FIG. 5. At step 502, a scene (for example, a still image, a video, or a text) of a media asset is obtained from a first source (for example, media content source 216). This is illustrated in FIG. 6 by depicting a scene 102 of a café. At step 504, a determination is carried out (for example, by a machine learning (ML) algorithm as described above and below) that the scene comprises a product (for example, any one of the Preferences as described in User Preference Database 220, 404 in FIGS. 2 and 4 above). FIG. 6 depicts this product as a pack of french fries 606 on the café's logo. At step 506, a non-fungible token (NFT) (and/or a cinemagraph) is obtained from a second source (for example, an NFT content source 218 and an NFT content source database 402 as described above with reference to FIGS. 2 and 4). At step 508, the NFT is matched to an advertiser based on the product (for example, by retrieving information from the user preference database 220, 404 and correlating preferences with a user account as described above with reference to FIG. 4). At step 510, an option to purchase the matched NFT is presented to the advertiser (for example, by displaying a pop-up notification on the user interface of user device 608 prompting the user to "Purchase NFT?" as shown in reference numeral 604 of FIG. 6).

In some embodiments, the user can use a voice remote or voice interface to utter a specific phrase like "Get this scene into my wallet". A phrase or sentence that is distinctive enough from "Buy this" which may indicate the content to be stored for later viewing. Upon applying a natural language module that determines an intent between storing content for later consumption vs buying into a NFT wallet. The phrase can play a major rule and should be easy enough for the user to utter and also makes a divergence between the two entirely different use cases. This is in correlation with how Amazon had claim for the "one click" use case on the buying portal. The expectation of the system is that the user has integrated a wallet to store the NFT related credentials and all required coin wallets to make the transaction. Where a content/scene might be available for X BTC/Y ETH. The auto debit rights in the system are behind the single sign on interface and hence the transaction happens on the fly reducing required tokens from respective wallet based on a priority/order set by the user.

Figure 7:
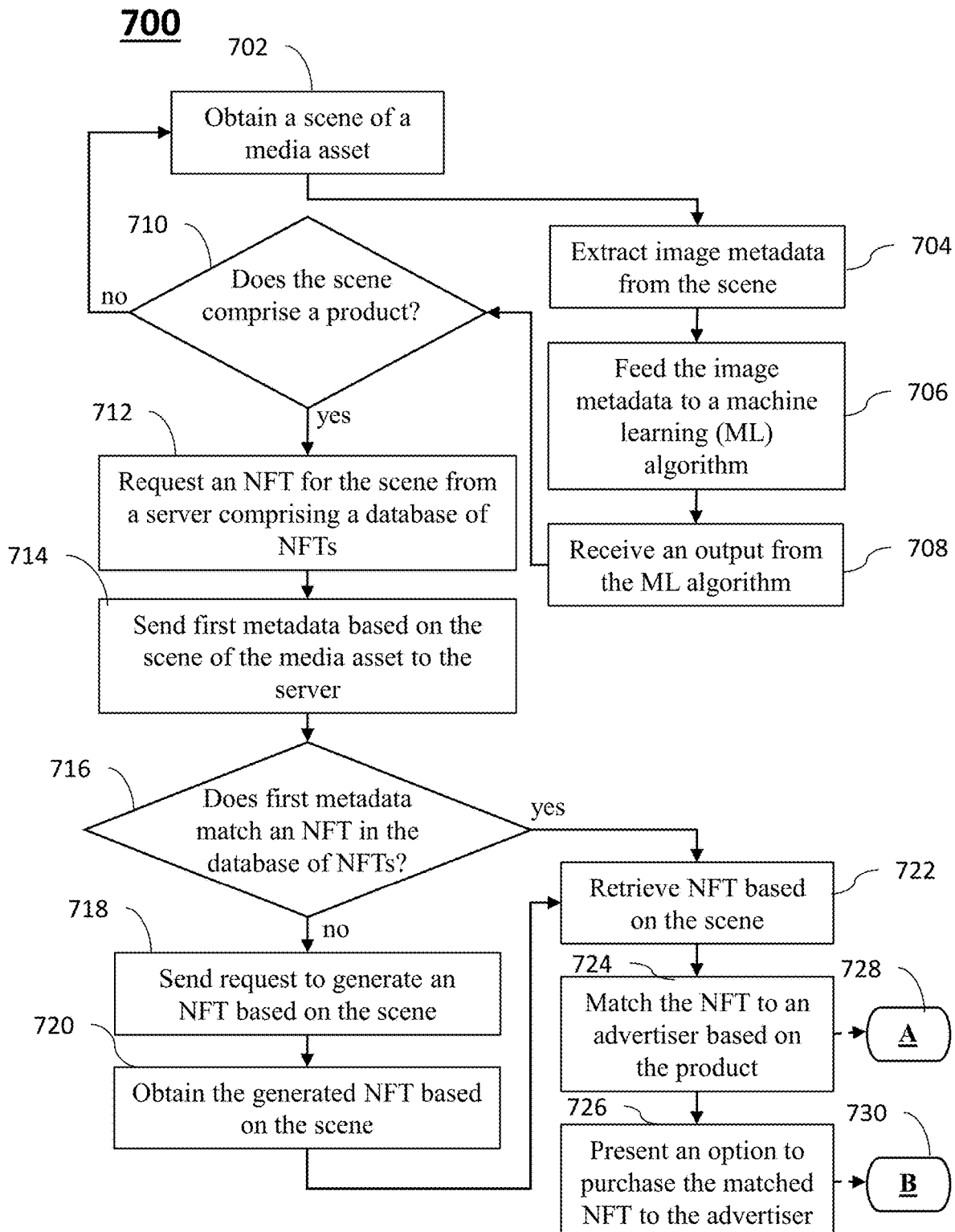
FIG. 7 shows another flowchart of illustrative steps involved in presenting an option to purchase an NFT, in accordance with some embodiments of the disclosure.

FIG. 7 is a flowchart of illustrative steps involved in presenting an option to purchase an NFT which builds on from the features presented in FIG. 5 above, in accordance with the arrangement described above with reference to FIGS. 1 to 6. At step 702 a scene of a media asset is obtained, as described with reference to 502 in FIG. 5 above. Steps 704 to 708 carry on from step 504 as described in in FIG. 5 above, wherein determining that the scene comprises a product may further comprise, at step 704, automatically extracting image metadata from a scene (for example, as described with relation to FIG. 4 above).

In one embodiment, advertisers, or brands can sign-up to get notified about the presence of their products within a new TV Series, movie, a broadcast, etc. based on predefined criteria, such as name of TV Series, total amount of time that the product is visible within the scene, whether the brand or product is mentioned in the audio of the scene or segment, genre of the scene, threshold confidence values (i.e., measure of certainty), etc. A confidence value is normally an output of a machine learning (ML) or computer vision algorithm for a classification or identification of an item. Similarly, advertisers and users can specify their preferences for actors, actresses, content genre, keywords in the audio, setting (beach, space, etc.), etc.

In one embodiment, the segment of the content can be automatically uploaded to a cinemagraph and/or NFT generation service to generate various potential cinemagraph and/or NFT ads based on the advertisers' preferences (for example, ways to highlight the object of interest, amount of motion, etc.). In such case, the object that triggered the bidding or the notification is designated as the object of interest for the Cinemagraph software. The image analysis metadata produced by the ML/computer visions block is shared with Cinemagraph software to help it determine how to produce the one more photograph with portions that include motion (loop). Similarly, the cinemgraph ads can then be shared with and advertising network or ads server to be used (this will require a configuration with the ad network).

At step 706, following on from step 704, the image metadata can be fed into the machine learning (ML) algorithm as discussed above and at step 708, an output from the ML algorithm is received which may indicate whether the scene comprises a product or not, as set out in step 710 and at step 504 of FIG. 5. If it is determined at step 710 that the scene comprises a product, the arrangement moves on to step 712 (described below). If it is determined at step 710 that the scene does not comprise a product, then the arrangement returns to step 702 and obtains a different scene from a media asset.

At step 712 an NFT is requested for the scene from a server comprising a database of NFTs (for example NFT content source 218). Subsequently the NFT may be obtained based on the scene, as described at step 506 of FIG. 5. Steps 714 to 722 are optional expansion steps based on step 506 of FIG. 5. For example, at step 714, obtaining, from the second source, the NFT based on the scene can further comprises sending first metadata based on the scene (such as scene metadata described in FIG. 4 above) to the NFT content source 218. At step 716 the first metadata can be compared with the metadata of each of the plurality of NFTs in the database of the NFT content source 218 (such as NFT content source database 402). If metadata of an NFT in the NFT content source database 402 matches the first metadata of the scene, the NFT based on the scene can be retrieved at step 722 and may be displayed on the user device. If no NFT is identified in the NFT content source database 402 with metadata matching the first metadata of the scene, then at step 718, a request can be sent to the NFT content source 218 to generate an NFT based on the scene. At step 720, the generated NFT based on the scene can be obtained from the NFT content source 218 and, subsequently, retrieved at step 722 and may be displayed on the user device. Subsequently, the arrangement proceeds to steps 724 and 726 which are identical to steps 508 and 510, respectively. That is to say, at step 724 the NFT is matched to an advertiser based on the product (for example, by retrieving information from the user preference database 220, 404 and correlating preferences with a user account as described above with reference to FIG. 4). At step 726, an option to purchase the matched NFT is presented to the advertiser (for example, by displaying a pop-up notification on the user interface of user device 608 prompting the user to "Purchase NFT?" as shown in reference numeral 604 of FIG. 6). Step 728 relates to optional steps which may be performed following step 724, the matching of the NFT to an advertiser based on the product. Similarly, step 730 relates to optional steps which may be performed following step 726, the presenting an option to purchase the matched NFT to the advertiser. Steps 728 and 730 are described in more detail with reference to FIG. 8 below.

Figure 8:
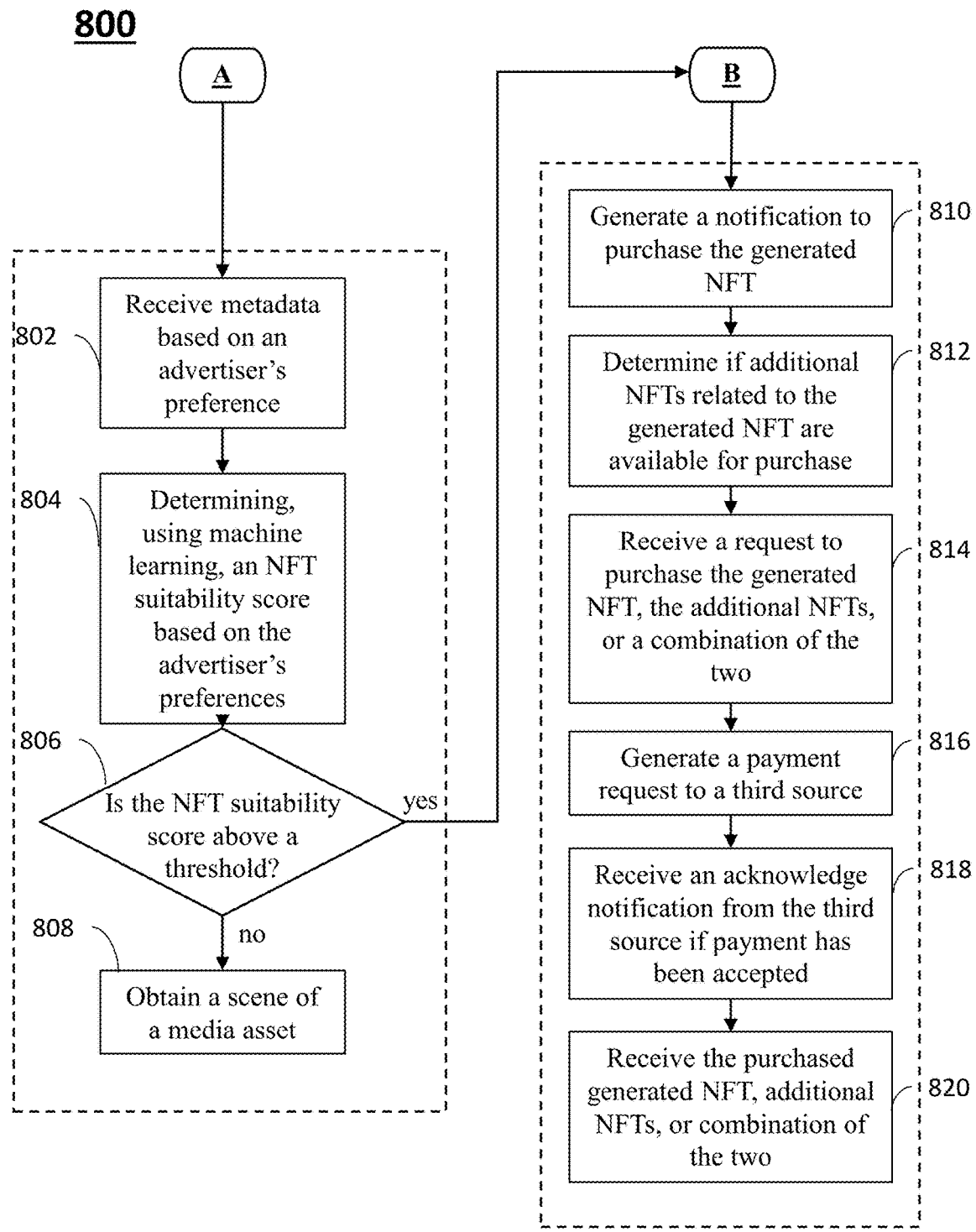
FIG. 8 shows yet another flowchart of illustrative steps involved in presenting an option to purchase an NFT, in accordance with some embodiments of the disclosure.

FIG. 8 is a flowchart of illustrative steps involved in presenting an option to purchase an NFT, in accordance with the arrangement described above with reference to FIGS. 1 to 7. FIG. 8 shows a first set of steps denoted "A" which follow on from step 724 of FIG. 7 and/or step 508 of FIG. 5. FIG. 8 also shows a second set of steps denoted "B" which follow on from step 726 of FIG. 7 and/or step 510 of FIG. 5.

At "A", matching the NFT to the advertiser may further comprise, at step 802, receiving (for example, using control circuitry) metadata based on a user's or advertiser's preference (for example as described with reference to FIG. 4 above). Subsequently, at step 804, an NFT suitability score based on the advertiser's preferences can be determined (for example, using a machine learning (ML) algorithm). For example, the media system 100 may be configured to generate a score (for example, an NFT suitability score) during the audio/video processing of the content. A scene that can be easily reproduced is likely to have a low NFT suitability score. For example, a video scene of 3 seconds showing the ocean might not be a scene that is not of great interest for advertisers to own as an NFT especially if its association to the content is irrelevant. The NFT score is determined by using models—such models can be static, which makes them suitable for movies, for example. However, some models are dynamic (i.e., updated over time based on the plot of the content, for example) which makes them suitable for TV series or content items that are related (for example, episode 5 and episode 7 of a TV show, or scene 11 of episode 5 and scene 3 of episode 7).

Popular scenes or portion of content that depict a brand can result in notifying the brand or an advertiser of an opportunity to bid on an NFT if such NFT is available on the marketplace. For example, a scene within a media asset might clearly show a Starbucks cup in the hand of an actor or actress, or a set of frames might contain a mug showing the Starbucks logo on a table, etc. The metadata/feature extraction can occur at the video ingestion phase (for example, before content is distributed to client device) using existing machine vision and video analysis software in order to extract deep frame metadata and create tags at the frame level in order to enable other features (for example, generation of a notification with a link to the specific portion of the content). Similarly, metadata extraction can run on video on demand (VOD) assets. The system can utilize existing solutions for such task, such as Rekognition (Amazon), cloud vision API (Google), Celebrity Recognition (also part of vision API), and any other existing solutions. Such segments (portion of them) can be used to produce one or more NFTs and/or cinemagraph advertisements. For example, in the example of a cinemagraph advertisement, the cinemagraph advertisement produced could be a still where everyone or everything in the image is static with the exception of the Starbucks mug (such as, for example, applying a lopping effect to the portion of the image or macroblocks associated with such portion).

Accordingly, at step 806 a determination is made whether the NFT suitability score is above a predetermined threshold, as described above. If it is below the predetermined threshold, the arrangement moves on to step 808 which begins the arrangement of FIGS. 5 and 7 at steps 502 and 702, respectively, wherein a new scene of a media asset is obtained. If the NFT suitability score is above the predetermined threshold at step 806, then the arrangement may progress by either moving on to step 726 as described above, or moving directly on to "B".

At "B", presenting an option to purchase the generated NFT to the advertiser may optionally further comprise, at step 810, generating (for example, using control circuitry), an indication or notification to purchase the generated NFT (as depicted by 604 in FIG. 6). Subsequently, at step 812, a determination can be made (for example, using control circuitry) that additional NFTs related to the generated NFT are available for purchase at the second source (for example, the NFT content source 218).

In one embodiment, an NFT Scene Similarity score may also be calculated in order to determine if additional NFTs are related to the generated NFT as described above. For example, a popular scene in episode 1 of a popular TV show might feature a perfume bottle (for example, Chanel) in an ad-like setting. Another scene or still (image) in a later episode or later portion of the content (for example, movie) might also feature the perfume bottle. In such case, both content portions are offered together as a package if the NFT Scene Similarity score exceeds a threshold. This could be important to prevent bidding on multiple similar content items (a content item can be a picture or portion of the content in this case). Scene comparison to determine or calculate the similarity score is triggered based on the value of parameters or the tags mentioned earlier. Comparing 2 portions to find common content or measure the similarities between frames in the segments can be accomplished in various ways. For example, the images with the common object (based on the deep scene metadata can be used) to calculate a similarity score. A perceptual hash algorithm can then be used (which creates a fingerprint that is distinct (but not unique) using various features of the content). the fingerprints can then be compared, and the similarity or difference score is determined. This is especially suitable if the objects in the scene are somewhat different (for example, in terms of contrast, rotations, etc.). In further embodiments, a package indication can be presented to indicate to the user (for example, advertiser) that later scenes or content (for example, content in a different episode) will be part of the package the user acquires. This is possible if the processing on the whole content (for example, TV series) has already been performed.

In one embodiment, the media system 100 can retrieve the similar scene(s) to the user (for example, advertiser) for viewing (for example, if they belong to a content item that is already accessible such as a VOD item). This way, the bidder or purchaser can be aware of how many scenes they are bidding on or buying as part of the package. If the similar scenes belong to a content item that is not available for viewing yet, the system can add a reference to the scene or portion to the user's queue and the content is accessible when the actual episode is available for viewing or purchase, etc.

In one embodiment, the package indication is presented during the presentation of the last scene in the package or when the last scene in the package is available for viewing. This way the purchaser can see all the portions of the content that they will be acquiring. Similarly, the creation of the packages can occur as the content becomes available or created during the pre-processing of the whole content (for example, TV Series).

Accordingly, at step 814, a request can be received (for example, using control circuitry) to purchase the generated NFT, the additional NFTs, or a combination of the two. In some arrangements, the additional NFTs may have to meet the NFT suitability threshold requirement as described above. At step 816, a payment request can be generated (for example using control circuitry) to a third source (for example, payment server 224 as described above with reference to FIG. 2). At step 818, an acknowledge notification can be received (for example, using control circuitry) from the third source if payment has been accepted. Methods and examples of payment may be as described above with reference to FIG. 4. At step 820, the purchased generated NFT, additional NFTs, or combination of the two may be received (using control circuitry) from the second source at the user device.

It is conceivable that not every scene in a movie is available for acquisition as an NFT. For example, scenes/segments not available for trading can be flagged as not tradable in the content item's manifest file (for example, via the use of NFT Availability tag) so that any trading related options can't be invoked by the user. Similarly, such scenes might not need to get processed by media framework analysis module. For example, the restriction can be flagged to the media analysis framework in various ways including identification of a segment number, time ranges, head flagger, etc. Similarly, a simple message can also be displayed to notify the user the content creator does not wish to make the current segment available for trading. In one embodiment, users (for example, advertisers) can link their media account to NFT marketplaces to specify their preference, etc. This allows the streaming service to utilize such information (since the marketplace data is accessible to the streaming service—or whatever data is accessible based on the marketplace API) to personalize the manifest file for the users— for example, to insert in-content notifications related to scenes or stills that are available for purchase. This can be based on their past purchases or bids, preferences, etc.

In one embodiment, recordings from public events (for example, fans at a stadium) are available for NFT bidding. For example, a Sports team might decide to own the rights to videos showing reactions of fans during key moments of a game (for example, touchdown, interception, etc.) for their own marketing purposes.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be example and not limiting. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method comprising:
   obtaining, from a first server, a scene of a media asset;
   automatically extracting image metadata from the scene;
   inputting the image metadata to a machine learning (ML) algorithm;
   receiving an output from the ML algorithm;
   identifying, based on the output from the ML algorithm, a product in the scene;
   requesting, from a second server comprising a database of a plurality of non-fungible tokens (NFTs), an indication of whether a NFT based on the product exists, wherein the request includes first metadata based on the identified product of the media asset;
   determining whether the metadata of an NFT in the database matches the first metadata by comparing the first metadata with metadata of the plurality of NFTs in the database;
   receiving the indication of whether the NFT based on the product exists based on determining whether the metadata of an NFT in the database matches the first metadata;
   if the indication indicates that the NFT based on the product does exist:
      matching the NFT to a first advertiser of the product based on the identified product; and
      presenting a first option to purchase the NFT to the first advertiser of the product;
   if the indication indicates that the NFT based on the product does not exist:
      transmitting, to the second server, a request for generation of the NFT;
      obtaining, from the second server, the generated NFT based on the product;
      matching the generated NFT to an advertiser of the product based on the identified product; and
      presenting an option to purchase the generated NFT to the advertiser of the product.

2. The computer-implemented method of claim 1, wherein metadata comprises any one of:
   an NFT type;
   a scene start time;
   a scene end time;
   ownership of the scene; and
   a bidding price for the NFT.

3. The computer-implemented method of claim 1, wherein matching the generated NFT to the advertiser of the product further comprises:
   receiving, using control circuitry, metadata based on an advertiser's preference;
   determining, using machine learning, an NFT suitability score based on the advertiser's preferences; and
   in response to determining that the NFT suitability score is above a threshold, matching, using control circuitry, the NFT to the advertiser.

4. The computer-implemented method of claim 1, wherein presenting an option to purchase the generated NFT to the advertiser of the product further comprises:
   generating, using control circuitry, an indication/notification to purchase the generated NFT;
   determining, using control circuitry, that additional NFTs related to the generated NFT are available for purchase at the second server;
   receiving, using control circuitry, a request to purchase the generated NFT, the additional NFTs, or a combination of the two;
   generating, using control circuitry, a payment request to a third server;
   receiving, using control circuitry, an acknowledge notification from the third server that payment has been accepted; and
   receiving, using control circuitry, the purchased generated NFT, additional NFTs, or combination of the two from the second server.

5. The computer-implemented method of claim 1, wherein the NFT comprises a cinemagraph.

6. The computer-implemented method of claim 1, wherein the identified product comprises any one of:
   a brand name; or
   a brand product.

7. The computer-implemented method of claim 1, wherein the scene comprises any one of:
   an image;
   a video; or
   a text.

8. The method of claim 1, wherein the trained model is trained by metadata related to the scene, and where the metadata comprises any one of an NFT type, a scene start time, a scene end time, ownership of the scene, or a bidding price for the NFT.

9. An apparatus comprising:
   a memory storing instructions;
   communication paths; and control circuitry coupled to the communication paths and the memory and configured to execute the instructions to:
  obtain, from a first server via the communication paths, a scene of a media asset;
  automatically extract image metadata from the scene;
  input the image metadata to a machine learning (ML) algorithm;
  receive an output from the ML algorithm;
  identify, based on the output from the ML algorithm, a product;
  request, from a second server comprising a database of a plurality of non-fungible tokens (NFTs), via the communication paths, an indication of whether a NFT based on the product exists, wherein the request includes first metadata based on the identified product of the media asset;
  determine whether the metadata of an NFT in the database matches the first metadata by comparing the first metadata with metadata of the plurality of NFTs in the database;
  receive the indication of whether the NFT based on the product exists based on determining whether the metadata of an NFT in the database matches the first metadata;
  if the indication indicates that the NFT based on the product does exist:
    match the NFT to a first advertiser of the product based on the identified product; and
    present a first option to purchase the NFT to the first advertiser of the product;
  if the indication indicates that the NFT based on the product does not exist:
    transmit, to the second server, a request for generation of the NFT;
    obtain, from the second server, the generated NFT based on the product;
    match the generated NFT to an advertiser of the product based on the identified product; and
    present an option to purchase the generated NFT to the advertiser of the product.

10. The apparatus of claim 9, wherein metadata comprises any one of:
  an NFT type;
  a scene start time;
  a scene end time;
  ownership of the scene; and
  a bidding price for the NFT.

11. The apparatus of claim 9, wherein to match the generated NFT to the advertiser of the product further comprises the control circuitry to execute the instructions to:
  receive, using control circuitry, metadata based on an advertiser's preference;
  determine, using machine learning, an NFT suitability score based on the advertiser's preferences; and
  in response to determining that the NFT suitability score is above a threshold, match, using control circuitry, the NFT to the advertiser.

12. The apparatus of claim 9, wherein to present an option to purchase the generated NFT to the advertiser of the product further comprises the control circuitry to execute the instructions to:
  generate, using control circuitry, an indication/notification to purchase the generated NFT;
  determine, using control circuitry, that additional NFTs related to the generated NFT are available for purchase at the second server;
  receive, using control circuitry, a request to purchase the generated NFT, the additional NFTs, or a combination of the two;
  generate, using control circuitry, a payment request to a third server;
  receive, using control circuitry, an acknowledge notification from the third server that payment has been accepted; and
  receive, using control circuitry, the purchased generated NFT, additional NFTs, or combination of the two from the second server.

13. The apparatus of claim 9, wherein the NFT comprises a cinemagraph.

14. The apparatus of claim 9, wherein the identified product comprises any one of:
  a brand name; or
  a brand product.

15. The apparatus of claim 9, wherein the scene comprises any one of:
  an image;
  a video; or
  a text.

16. The apparatus of claim 9, where the trained model is trained by metadata related to the scene, and where the metadata comprises any one of an NFT type, a scene start time, a scene end time, ownership of the scene, or a bidding price for the NFT.

* * * * *